Patented Jan. 25, 1949

2,459,903

UNITED STATES PATENT OFFICE 2,459,903

CATALYST GELS

Vanderveer Voorhees, Homewood, Ill., assignor to Standard Oil Company, Chicago, Ill., a corporation of Indiana No Drawing. Application July 22, 1944,
Serial No. 546,229

6 Claims. (Cl. 34—9)

This invention relates to the preparation of inorganic oxide gel catalysts and more particularly to a method of drying catalysts which are prepared in the form of hydrogels. Still more particularly the invention relates to the drying of spherical particles of hydrogels to produce catalysts having discrete particles of rounded or spheroidal shape substantially without agglomeration.

One object of the invention is to effect the drying or dehydration of spheroidal catalyst gel particles in an economic manner without rupture or distortion of the surface, thereby producing a catalyst having a higher physical strength and higher resistance to attrition than when dried in the ordinary manner. Another object of the invention is to effect the drying of catalyst gel particles of small size without loss of catalytic activity frequently encountered in the methods of drying previously employed in the art. Still another object of the invention is to prepare catalysts and particularly hydrocarbon conversion catalysts of high activity and uniform small particle size. Other objects of the invention will be apparent from the following description thereof.

Heretofore it has been the practice in preparing catalysts from inorganic oxide gels, for example silica hydrogel or alumina hydrogel, to coagulate the gel in a mass which may be dried directly or after cutting into irregular pieces and washing with water or other washing liquids. On drying wet massive hydrogels of this type, generally by standing in dry air or gently heating in a ventilated oven, stresses of considerable magnitude are developed in the gel which induce fracturing of the pieces or mass so that the final dried gel product is a granular material having a considerable range of particle size from small lumps down to a very fine powder. It has heretofore been the practice to grade such catalyst by screening and/or grinding if necessary, generally after ignition to a high temperature. The particles of catalyst prepared in this way still possess strains which eventually result in their fragmentation into smaller particles during use which eventually render the catalyst useless for further service, partly because of the difficulty of handling and recovering them and partly because of their unavoidable loss from the apparatus. The exceedingly fine particles pass thru cyclone separators and even thru electrical precipitators.

By my process I prepare the catalyst gel particles in rounded or spheroidal form by the coagulation of individual droplets of a sol in a supporting fluid medium and thus avoid the development of internal strains, because the particles have a uniform structure and symmetrical form and are too small to develop strains. Since each particle of gel is coagulated separately, out of contact with other masses of gel or any other solid surface, it becomes surrounded by a smooth, glassy surface which has a natural, generally symmetrical, orientation with respect to the particle, thereby tending to strengthen the particle and increase its resiliency and resistance to abrasion and rupture. As a result when this catalyst is used in systems wherein it is maintained in a turbulent fluidized state, there is a minimum loss of energy in the catalyst mass due to friction between the catalyst particles. Likewise the life of the catalyst is greatly increased as a result of the resistance to comminution by abrasion, and wear of the apparatus is also reduced.

In preparing catalyst in spheroidal form by my process, a suitable sol, usually a metal oxide sol, is prepared in metastable form and dispersed in a coagulating liquid wherein droplets are produced which rapidly coagulate into spheroidal particles of gel. Various methods may be employed for carrying out this part of the process. Thus the sol, for example silica sol produced by the rapid mixing of sodium silicate solution and a strong acid such as hydrochloric or sulfuric acid, may be formed into droplets by a spray or distributor either beneath the surface or above the surface of the coagulating bath. If fine streams of the sol are introduced below the surface of the bath, for example an oil bath, they will break up into droplets of more or less uniform size depending on the surface tension, density and viscosity of the oil and the sol, the size of the sol stream, coarseness of spray, degree of agitation, and other factors.

Alumina sols, iron oxide sols, chromium oxide sols, and various other sols may be employed for preparing catalysts of the corresponding oxides. These are generally prepared by mixing two or more solutions in a manner well known in the art. Thus an aluminum salt solution may be mixed with a sodium silicate solution to produce a silica-alumina sol. By controlling the pH with acid or base, the desired stability can be obtained. Usually a setting time of 5 to 30 minutes is satisfactory.

The coagulating medium employed to support the sol droplets during gelation may be a mineral oil, such as naphtha, kerosene, gas oil, light or heavy lubricating oils such as mineral seal and neutral oils, and other oils including the vegetable and animal oils, soy bean oil, cottonseed oil, castor oil, fish oil, etc.

In order to facilitate the coagulation of the sol, various coagulating agents may be added to the liquid coagulating bath. Thus I may employ ammonia or amines in the bath when coagulating silicic acid sols. Acids such as acetic and butyric may be employed for speeding the coagulation of basic sols such as aluminates, chromates, etc. The depth of the coagulating bath should be sufficient to effect at least a partial coagulation of the droplets of sol to provide a surface or envelope of coagulated gel around each particle before reaching the bottom so that the particles of gel may thereafter be handled without rupture, coalescence or agglomeration.

If desired, the gel particles formed in the coagulating bath may be allowed to fall into a layer of water or aqueous solution below the coagulating bath and the particles of catalyst may be further coagulated by the action of acids, bases or salts contained in the water. The water layer may also be simultaneously employed to wash the catalyst hydrogel particles free of undesirable reagents, salts or other by-products of the reaction by which they are produced. When washing is necessary it may best be accomplished by countercurrently passing a stream of the catalyst hydrogel particles thru a current of fresh water, for example distilled water in a suitable contacting column. In the case of certain catalysts such as alumina gels produced from substantially salt-free sols which may be prepared by the action of water or weak acid on amalgamated aluminum metal, no washing of the gel particles is required. It may be desirable here to dispense entirely with the use of a water layer below the coagulating bath, in which case the catalyst gel particles are mechanically separated from the coagulating bath and are then ready for drying. I may also employ a coagulating liquid having a higher density than that of the hydrogel and float the gel product from the bath. In this case the sol may be injected below the surface of the bath, preferably at a low point.

Having prepared the catalyst in the form of discrete spherical particles of hydrogel, it is then necessary to remove from them the water of which the hydrogel is largely composed. Thus at this stage the catalyst hydrogels will ordinarily contain about 75 to 95 per cent of water, removal of which has heretofore constituted a difficult problem. If it is attempted to dry the catalyst in the usual way by heating in an oven, it is found that the particles agglomerate into masses or clusters which are difficult to break up. When such catalyst masses are broken up or disintegrated to free the individual particles, it is found that the particles produced in this way are misshapen and weakened by unsymmetrical, distorted, and non-spheroidal surfaces resulting in subsequent disintegration in use. Furthermore, such catalyst masses cannot be broken up into individual particles without destruction of a great many of the particles with the production of ultrafine material which it is desired to avoid.

I have now discovered that catalysts prepared in the form of hydrogel particles as described can be successfully dried without agglomeration by suspending them in a suitable liquid and removing the water in the form of vapor. For this purpose it is desirable to use a water-immiscible liquid, for example mineral oils, aromatic hydrocarbons, naphtha, kerosene, etc. In order to facilitate the removal of water occluded by masses of gel particles, various dispersing agents may be added to the drying bath such as aluminum soaps, zinc soaps, etc., for example aluminum stearate, zinc oleate or ricinoleate, ammonium soaps, etc. A current of air or other gas may be passed thru the heated liquid drying bath and sufficient agitation may be obtained either by a mechanical agitator or by the action of the air currents to assist in preventing agglomeration of catalyst particles in the bath while the initial excess water is being removed and the surfaces of the particles are dried sufficiently to prevent further adhesion. Before subjecting wet hydrogel to the desiccating treatment just described, excess water adhering to the catalyst and occluded therein may be removed by various means, for example by absorption in porous materials such as blotting paper, by filtration on a suction filter, by centrifuging, or by replacement with other liquids such as ethyl alcohol.

When the catalyst particles have been sufficiently dispersed in the dehydrating bath, heat is applied to the bath in an amount sufficient to raise the temperature to a point where the vaporization of water from the catalyst is substantially increased as a result of increased vapor pressure. In order to obtain sufficiently rapid drying it is desirable to operate at a temperature above 150° F. and preferably in the range of about 200 to 300° F. It is often possible to employ still higher temperatures, however, without damage to the catalyst particles and temperatures of 400° F. have been used. For this purpose a bath of kerosene is suitable, a current of air, steam or inert gas, e. g. carbon dioxide, nitrogen or ammonia being injected to obtain the desired agitation and facilitate the removal of water vapors. Where the bath is composed of a lower boiling solvent such as naphtha, for example solvent naphtha having a boiling range of 150 to 260° F., or dry cleaners naphtha having a boiling range of 190 to 330° F., or Stoddard solvent having a boiling range of 300 to 410° F., the bath liquid is usually distilled overhead along with the water evolved from the catalyst, in which case it is condensed with the water, separated therefrom and returned to the dehydration bath.

It is not necessary to remove water from the catalyst to complete dryness by means of the desiccating liquid bath as it has been found that after the removal of only about 5 to 50 per cent of the water in the gel the catalyst can be completely dried in an oven or by exposure to dry air without any further danger of agglomeration. I may therefore continuously or intermittently withdraw catalyst from the desiccating bath, separate it from the solvent, and complete the drying in an oven usually at a temperature of about 250 to 400° F. Any solvent adhering to the catalyst may be recovered by extraction, for example with water, or by condensation of the vapors on final drying. After about 12 to 24 hours in the drying oven, the catalyst may then be heated slowly in a muffle, and ignited at an elevated temperature, e. g. 900 to 1200° F., usually for a period of about 1 to 36 hours, whereupon it is in condition for service.

In fluidized catalyst operations, where the catalyst is maintained in suspension by an upflowing stream of gases undergoing reaction, it is generally desirable to employ catalyst having a particle size of about 50 to 250 mesh. Catalyst coarser than 50 mesh is not so readily maintained in fluidized form except when a considerable amount of finer catalyst is also present. If the particle size is appreciably finer than 250 to 300 mesh, there is difficulty in recovery. When employed in upflow reactors as in the conversion or cracking of hydrocarbons for the formation of gasoline and other petroleum products, it is generally desirable to employ upflow vapor velocities of the order of 0.2 to 4 feet per second and a catalyst density of about 0.3 to 0.8 of the density of the catalyst at rest in so-called dense phase operation. Relative weight velocity may be about 0.4 to 10 lbs. feed per hour per lb. catalyst, depending on the size of the catalyst particles, temperature and other factors. For hydrocarbon conversion, a temperature of about 850 to 1100° F. is usually used. After the catalyst has been in contact with the hot hydrocarbon vapors for about one-half hour to four hours, it is regenerated by oxidation with an oxygen-containing gas at about 900–1200° F. to remove deposits of carbon, after which it can be used again repeatedly. The symmetrical strain-free structure of my catalyst contributes to long life and minimum degradation from frequent heating, cooling and recycling.

Having thus described my invention what I claim is:

1. The process of drying inorganic oxide gels in the form of small discrete spheroidal particles which comprises suspending in a water-immiscible hydrocarbon liquid bath spheroidal particles of a hydrogel having a strong agglomerating tendency, maintaining said liquid at an elevated temperature at which water exerts a substantial vapor pressure, removing water vapor from the suspension by injecting a desiccating gas therethrough thereby reducing the water content of the suspended gel particles to a point where agglomeration ceases, and thereafter separating the gel particles from the hydrocarbon liquid bath.

2. The process of claim 1 wherein the bath employed is a naphtha boiling below 400° F.

3. The process of claim 1 wherein the bath employed contains a dispersing agent of hydrogel particles selected from the class consisting of the water-insoluble soaps having the effect of aiding in preventing agglomeration of wet particles of gel.

4. The process of claim 1 wherein the temperature of the bath is maintained at about 150 to 400° F.

5. The process of claim 1 wherein the said immiscible liquid boils between about 150 and 400° F. and the temperature of the bath is maintained at about the boiling point of the said liquid.

6. The process of claim 1 wherein the density of said liquid bath is maintained at a point at which untreated hydrogel particles are supported but the treated gel particles will settle therethrough when sufficiently dehydrated to become non-agglomerating.

VANDERVEER VOORHEES.

REFERENCES CITED

The following references are of record in the file of this patent:

UNITED STATES PATENTS

| Number | Name | Date |
| --- | --- | --- |
| 1,755,496 | Behrman | Apr. 22, 1930 |
| 2,138,048 | Vesce | Nov. 29, 1938 |
| 2,232,727 | Peterkin et al. | Feb. 25, 1941 |
| 2,284,248 | Baker et al. | May 26, 1942 |
| 2,384,946 | Marisic | Sept. 18, 1945 |
| 2,387,596 | Marisic | Oct. 23, 1945 |
| 2,390,556 | Ruthruff | Dec. 11, 1945 |

FOREIGN PATENTS

| Number | Country | Date |
| --- | --- | --- |
| 100,392 | Great Britain | June 15, 1916 |